United States Patent
Nakamoto et al.

(10) Patent No.: US 7,266,264 B2
(45) Date of Patent: Sep. 4, 2007

(54) APPARATUS AND METHOD OF COMPENSATING TRANSMISSION PROPERTY OF LIGHT DEMULTIPLEXER/LIGHT MULTIPLEXER

(75) Inventors: Hiroshi Nakamoto, Kawasaki (JP); Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 11/019,205

(22) Filed: Dec. 23, 2004

(65) Prior Publication Data

US 2006/0067701 A1 Mar. 30, 2006

(30) Foreign Application Priority Data

Sep. 28, 2004 (JP) .............................. 2004-282835

(51) Int. Cl.
*G02B 6/28* (2006.01)
*H04J 14/02* (2006.01)

(52) U.S. Cl. .......................................... 385/24; 398/81
(58) Field of Classification Search ................. 385/24; 356/249, 250; 398/29, 81, 148, 175
See application file for complete search history.

(56) References Cited

U.S. PATENT DOCUMENTS

| | | | |
|---|---|---|---|
| 6,381,069 B1 * | 4/2002 | Riant et al. ................. | 359/569 |
| 6,462,844 B1 | 10/2002 | Kai et al. | |
| 6,654,516 B2 * | 11/2003 | So ................................ | 385/27 |
| 7,079,769 B1 * | 7/2006 | Tsukitani et al. ............. | 398/81 |
| 2002/0001433 A1 | 1/2002 | Hosoi .......................... | 385/37 |
| 2002/0034360 A1 * | 3/2002 | Ishii ............................. | 385/37 |
| 2002/0067889 A1 * | 6/2002 | Wakabayshi et al. ......... | 385/37 |
| 2002/0154359 A1 | 10/2002 | Tsuda et al. | |
| 2004/0120639 A1 | 6/2004 | Elbers et al. | |
| 2004/0136728 A1 | 7/2004 | Sekiya et al. | |
| 2005/0213987 A1 * | 9/2005 | Nakamura et al. ........... | 398/147 |

FOREIGN PATENT DOCUMENTS

| | | |
|---|---|---|
| JP | 2001-44935 | 2/2001 |
| JP | 2002-14243 | 1/2002 |

OTHER PUBLICATIONS

European Search Report for Application No. GB0428463.4 dated May 24, 2005.

\* cited by examiner

*Primary Examiner*—Brian Healy
*Assistant Examiner*—Charlie Peng
(74) *Attorney, Agent, or Firm*—Staas & Halsey LLP

(57) ABSTRACT

The present invention offers a compensation device having a transmission property for collectively compensating inclinations of accumulated transmission properties in a signal wavelength band of light signals of a plurality of channels configuring a wavelength-multiplexed light, among wavelength dependencies of transmission properties of a plurality of sets of light demultiplexers and light multiplexers.

18 Claims, 16 Drawing Sheets

TRANSMISSION PROPERTY OF GRADIENT COMPENSATION FILTER

ACCUMULATED TRANSMISSION PROPERTY OF AWG

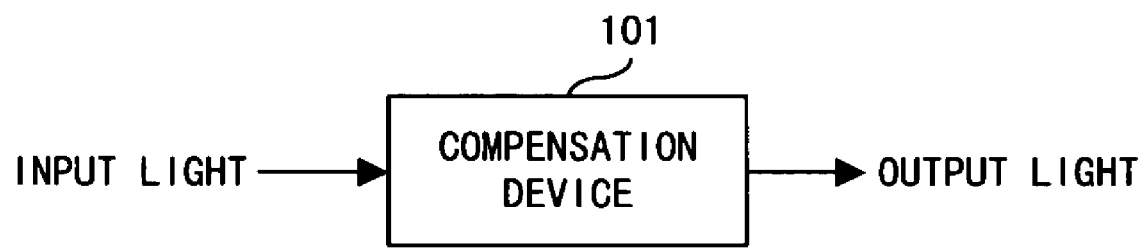
F I G. 2 A

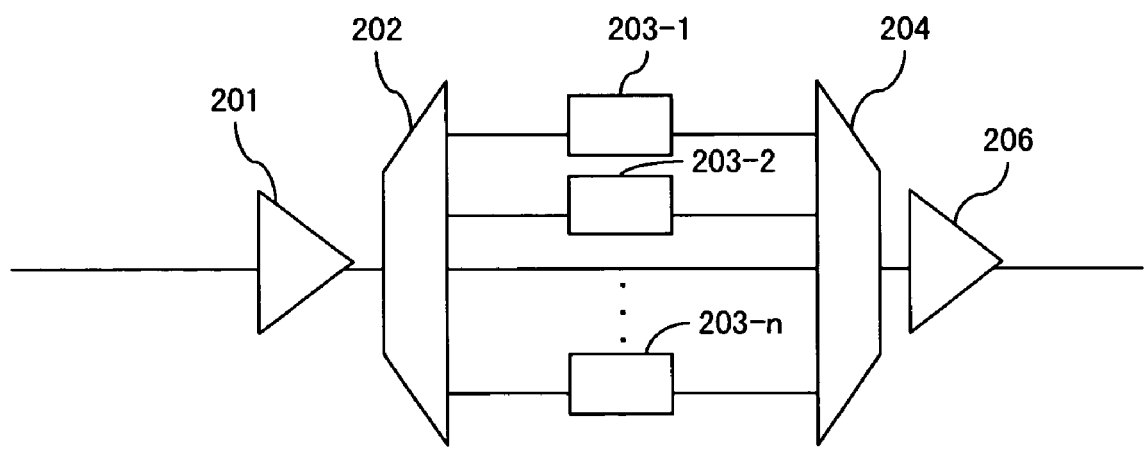
F I G. 2 B

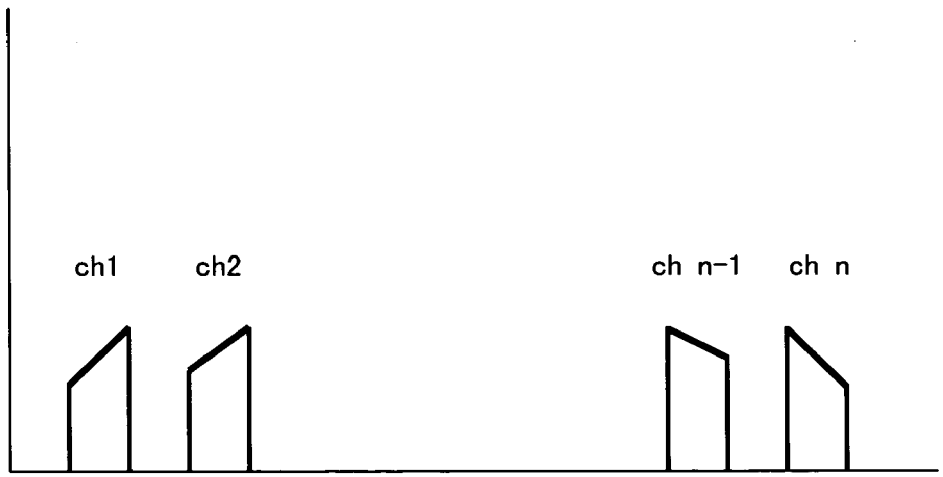
TRANSMISSION PROPERTY OF GRADIENT COMPENSATION FILTER
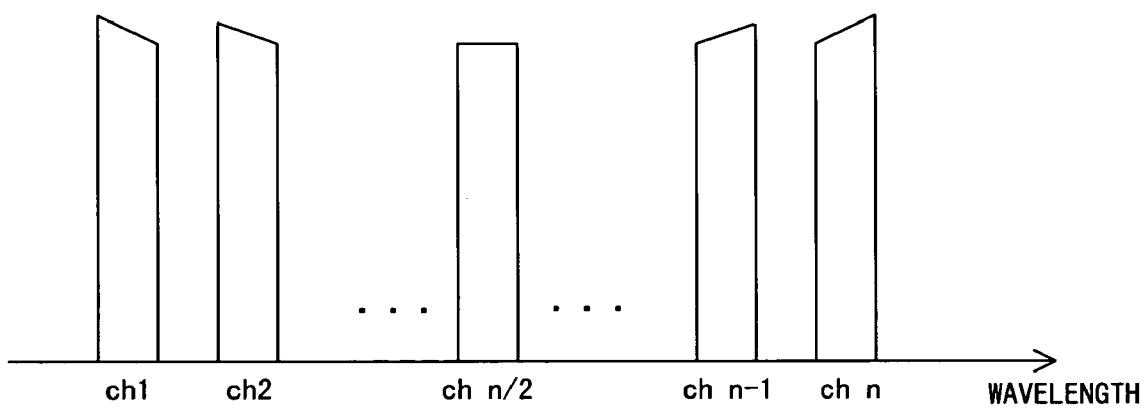
ACCUMULATED TRANSMISSION PROPERTY OF AWG
F I G. 3

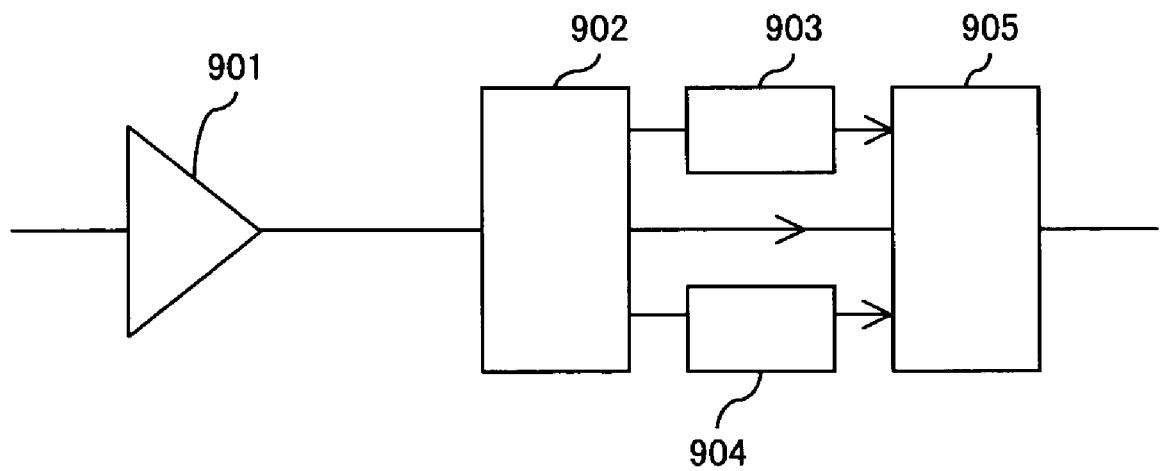
F I G. 9

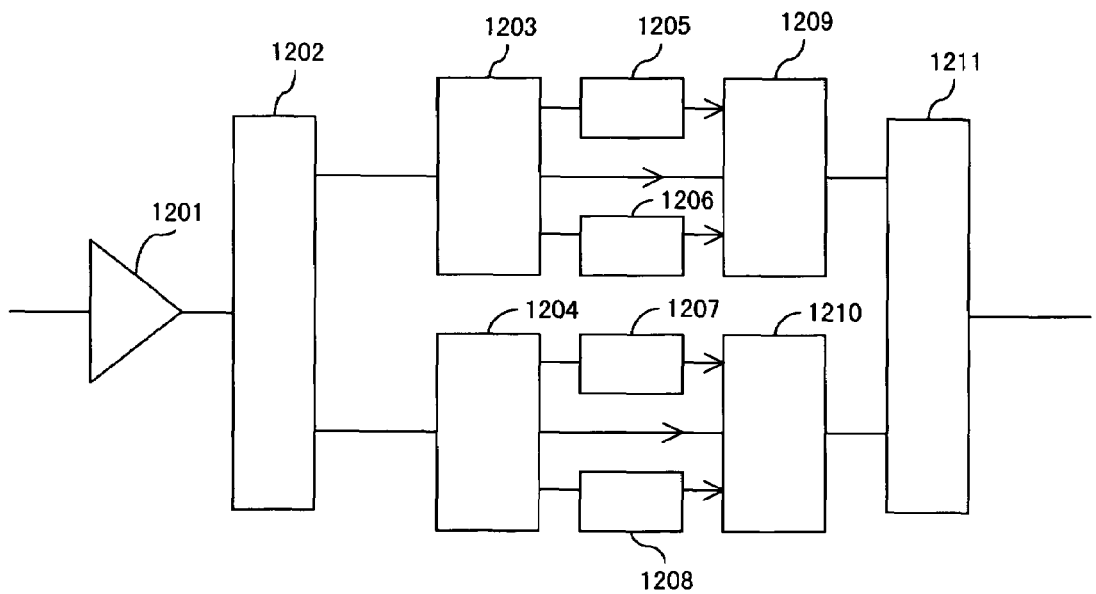
F I G. 1 2

APPARATUS AND METHOD OF COMPENSATING TRANSMISSION PROPERTY OF LIGHT DEMULTIPLEXER/LIGHT MULTIPLEXER

BACKGROUND OF THE INVENTION

Field of the Invention

The present invention relates to an apparatus and a method of compensating the transmission property of a light demultiplexer/light multiplexer in a wavelength-division multiplexing (WDM) optical communication system.

FIG. 1A shows a conventional WDM optical communication system. The WDM optical communication system of FIG. 1A includes a transmission apparatus (TX) 11, optical fibers 12, 17 and 22, and a reception apparatus (RX) 23. Between the optical fibers 12 and 17, the first drop and add node is arranged. Between the optical fibers 17 and 22, the second drop and add node is arranged. The first drop and add node includes light amplifiers 13 and 16, a light demultiplexer 14 and a light multiplexer 15. The second drop and add node includes light amplifiers 18 and 21, a light demultiplexer 19 and a light multiplexer 20. Furthermore, a light repeater that amplifies a light signal is arranged in a light transmission path.

The transmission apparatus 11 includes a plurality of light transmission devices that respectively transmit light signals of a plurality of wavelengths (channels) and a light multiplexer that multiplexes the light signals. A reception apparatus 23 includes a light demultiplexer that demultiplexes a wavelength-multiplexed light and extracts the light signals of respective channels and a plurality of light reception devices that respectively receive light signals of a plurality of channels.

In the first drop and add node, the light demultiplexer 14 of multiple-outputs demultiplexes a wavelength-multiplexed light into a light signal of each channel and drops a part of the light signals. The light multiplexer 15 of multiple-inputs multiplexes the remaining light signals and the added light signal to be outputted. The second drop add node also implements operations same as those of the first drop and add node.

Generally, a plurality of drop and add nodes is arranged in a light transmission path for dropping and adding the light signal of each channel. In order to respond to the expansion of information networks, it is desirable to arrange equal to or more than dozens of drop and add nodes. As a light demultiplexer/light multiplexer, for example, an arrayed waveguide grating (AWG) is used (refer to, for example, patent literature 1).

Furthermore, a optical equalizer that compensates the gain wavelength dependence of a light amplifier is known (refer to, for example, patent literature 2).

[Patent literature 1] Japanese patent application laid-open disclosure number 2002-014243

[Patent literature 2] Japanese patent application laid-open disclosure number 2001-044935

However, there is the following problems in the above-mentioned conventional WDM optical communication system.

It is desirable that the transmission property of AWG that is used as a light demultiplexer/light multiplexer is flat in a signal wavelength band of each channel. Here, the transmission property of AWG indicates the dependence of the transmission rate of the light that passes through the AWG on the wavelength.

However, as the number of channels increases, the transmission property changes depending on wavelength in a signal wavelength band so that the property has an inclination in a channel of the shortest wave or the longest wave. When a plurality of AWGs are used, inclinations of this transmission property are accumulated to be large as shown in FIG. 1B, thereby deteriorating a light signal. Therefore, the number of the drop and add nodes is restricted in a communication system in order to restrain the deterioration of the light signal as much as possible.

SUMMARY OF THE INVENTION

The subject of the present invention is to compensate the accumulated inclinations of a transmission property of the light demultiplexer/light multiplexer in a WDM optical communication system.

A compensation apparatus of the present invention is used in a WDM optical communication system comprising a plurality of sets of light demultiplexers and light multiplexers and this apparatus is provided with a compensation device. This compensation device has a transmission property for collectively compensating the inclinations of accumulated transmission properties in a signal wavelength band of light signals of a plurality of channels configuring a wavelength-multiplexed light, among the wavelength dependencies of the transmission properties of the plurality of sets of light demultiplexers and light multiplexers.

BRIEF DESCRIPTION OF THE DRAWINGS

FIG. 2A shows the principle of a compensation apparatus of the present invention;

FIG. 2B shows the first compensation apparatus;

FIG. 3 shows the transmission property of a compensation filter of the first compensation apparatus;

FIG. 9 shows the second compensation apparatus;

FIG. 12 shows the fourth compensation apparatus;

DESCRIPTION OF THE PREFERRED EMBODIMENTS

The following is the detailed explanation of the preferred embodiments for implementing the present invention in reference to the drawings.

FIG. 2A shows the principle of a compensation apparatus of the present invention. The compensation apparatus of FIG. 2A is a compensation apparatus used in the WDM optical communication system comprising a plurality of sets of light demultiplexers and light multiplexers and this apparatus is provided with a compensation device 101.

The compensation device 101 includes a transmission property for collectively compensating the inclinations of accumulated transmission properties in a signal wavelength band of light signals of a plurality of channels configuring a wavelength-multiplexed light, among the wavelength dependencies of the transmission properties of the plurality of sets of light demultiplexers and light multiplexers. As this transmission property, the following properties are used.

(1) Curve-shaped transmission property obtained by vertically flipping an envelope of the shape shown in each signal wavelength band in a drawing showing the wavelength dependency of an accumulated transmission property (2) Transmission property having a shape that periodically changes according to a wavelength These transmission properties have inclinations opposite to that of the accumulated transmission property in a signal wavelength band of the light signal of each channel.

By arranging a compensation apparatus equipped with the compensation device 101 in a WDM optical communication system, it becomes possible to compensate the accumulated inclinations of the transmission property of a light demultiplexer/light multiplexer.

Figure 8:
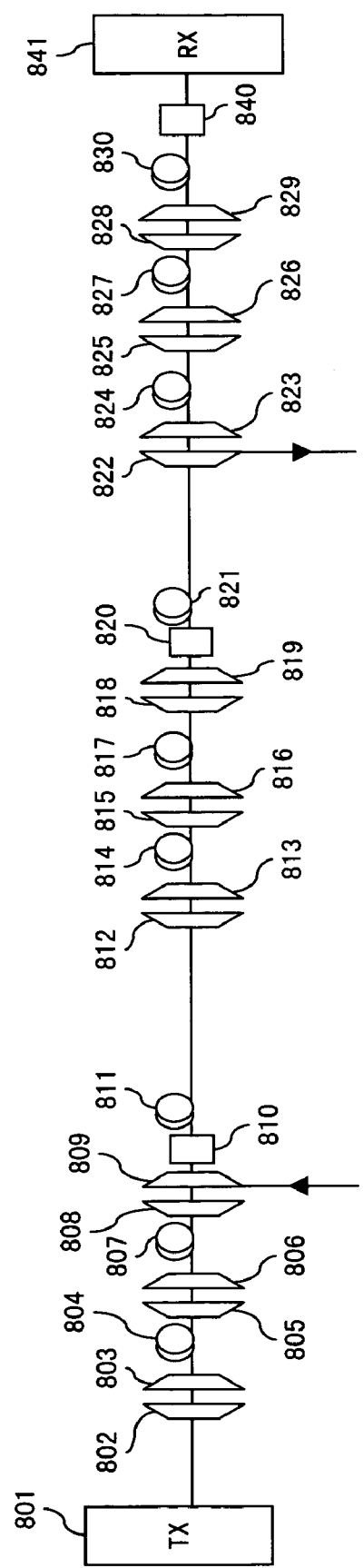
FIG. 8 shows the WDM optical communication system including compensation filters.
Figure 10:
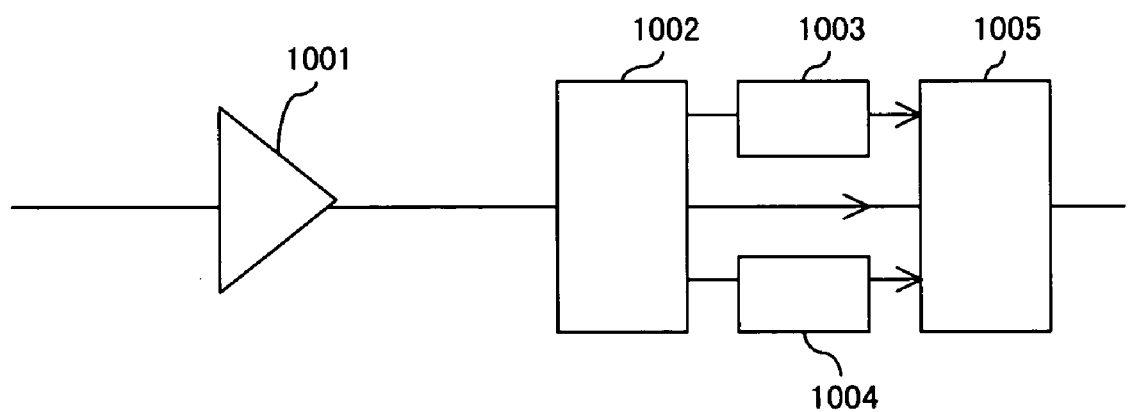
FIG. 10 shows the third compensation apparatus.

The compensation device 101 corresponds to, for example, gradient compensation filters 203-$i$ (i=1, 2, ..., n) of FIG. 2B, compensation filters 810, 820 and 840 of FIG. 8, a shortwave side compensation filter 903 and a longwave side compensation filter 904 of FIG. 9, a shortwave side compensation filter 1003 and a longwave side compensation filter 1004 of FIG. 10 and shortwave side compensation filters 1205 and 1207 and longwave side compensation filters 1206 and 1208 of FIG. 12. These drawings are described later.

According to the present invention, it becomes possible to compensate the accumulated inclination of the transmission property of a light demultiplexer/light multiplexer used in a WDM optical communication system. Therefore, the restriction of the number of drop and add nodes due to the accumulated transmission property of AWG can be significantly reduced.

According to this preferred embodiment, in order to compensate the inclination of a property in which the transmission properties in a signal wavelength band of each channel are accumulated, among the wavelength dependencies of the transmission properties of the plurality of sets of light demultiplexers and light multiplexer mounted on a plurality of drop and add nodes, a light component including a transmission property opposite to that inclination is arranged. Consequently, the restriction on the number of drop and add nodes can be reduced so that the number becomes double or more.

FIG. 2B shows the compensation apparatus in which a light filter is used as a light component. The compensation apparatus of FIG. 2B is mounted every several nodes. This apparatus includes light amplifiers 201 and 206, a light demultiplexer 202, a gradient compensation filter 203-$i$ (i=1, 2, ..., n) that is added for each channel and a light multiplexer 204. Each gradient compensation filter 203-$i$ has a transmission property of the inclination that is obtained by reversing the inclination of the accumulated transmission property of AWG in terms of positive and negative, in the signal wavelength band of each channel as shown in FIG. 3. In this way, the inclination of the accumulated transmission property can be compensated, thereby preventing signal deterioration.

In the configuration of FIG. 2B, it is necessary to mount the gradient compensation filter 203-$i$ for each channel. However, the inclinations of transmission properties of all the channels can be collectively compensated only with one compensation filter by utilizing the shape of the accumulated transmission property of AWG. The following is the detailed explanation of this compensation method.

Figure 4:
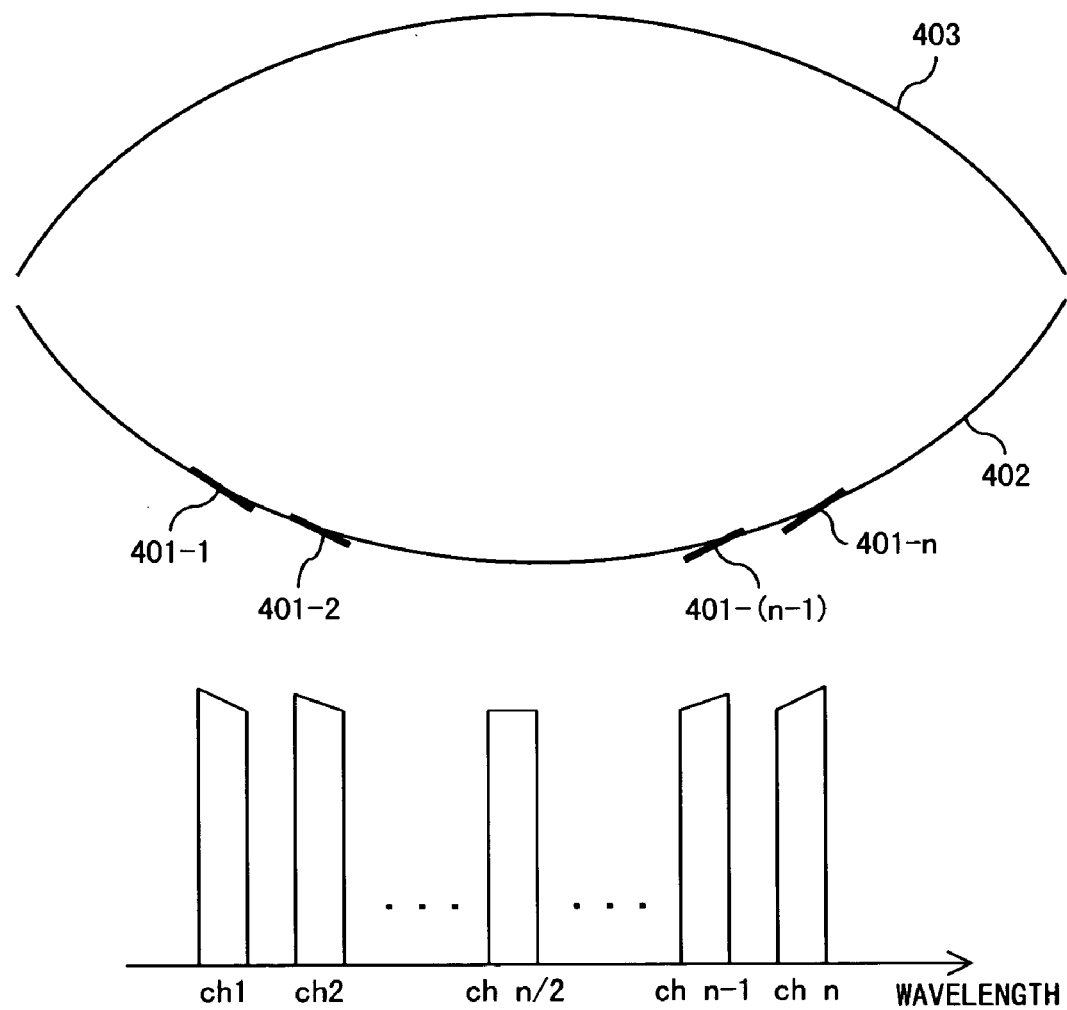
FIG. 4 shows the envelope of the inclination of a transmission property.

As shown in FIG. 4, the inclination of the transmission property of AWG is generally small in channel ch n/2 of the center wavelength of a wavelength-multiplexed light but the inclination becomes gradually larger in the channel on the side of a shortwave or a longwave. In FIG. 4, line segments 401-1, 401-2, 401-($n$-1) and 401-$n$ correspond to the shapes of the upper sides of quadrangles of the accumulated transmission properties of channels ch1, ch2, ch n–1 and ch n, respectively. The absolute values of the inclinations of the line segments 401-1 and 401-$n$ are larger than those of the inclinations of the line segments 401-2 and 401-($n$-1).

Thereupon, if a light filter that has the transmission property having a shape of a curve 403 that is obtained by vertically flipping the envelope 402 of these line segments is used as a compensation filter, the inclinations of the transmission properties of all the channels can be collectively compensated.

The transmission property of AWG to be compensated can be measured by passing an ASE (Amplified Spontaneous Emission) light through the corresponding path or by passing the light while changing a wavelength of the variable wavelength source light. Otherwise, this property can be determined from the data of a component that is used in a light transmission path. It is sufficient to implement this operation once at the time of the initial operation of a system or after the route change is implemented.

Figure 5:
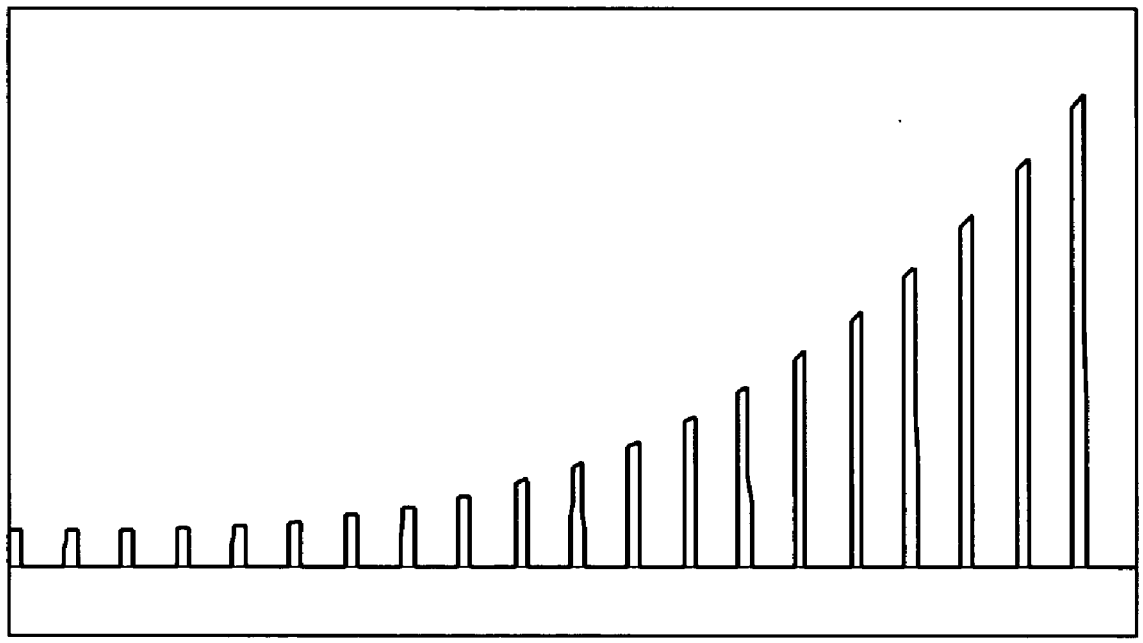
FIG. 5 shows the transmission property of AWG.
Figure 6:
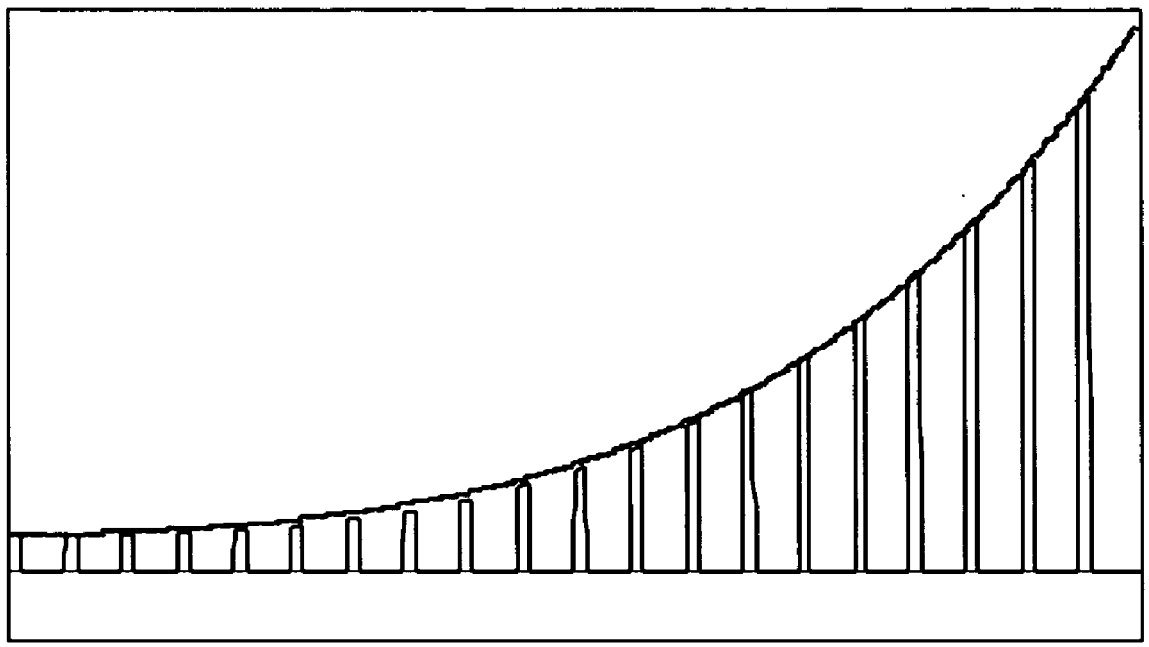
FIG. 6 shows the envelope of the transmission property of AWG.

The shape of the transmission property of a compensation filter can be determined by calculating the envelope of a shape in each signal wavelength band of the transmission property of AWG to be compensated, as mentioned above. FIG. 5 shows the simulation results of the transmission property of AWG to be compensated. FIG. 6 shows the shape of an envelope for the transmission property. In fact, the shape obtained by vertically flipping this envelope is used as the transmission property of a compensation filter.

Figure 7:
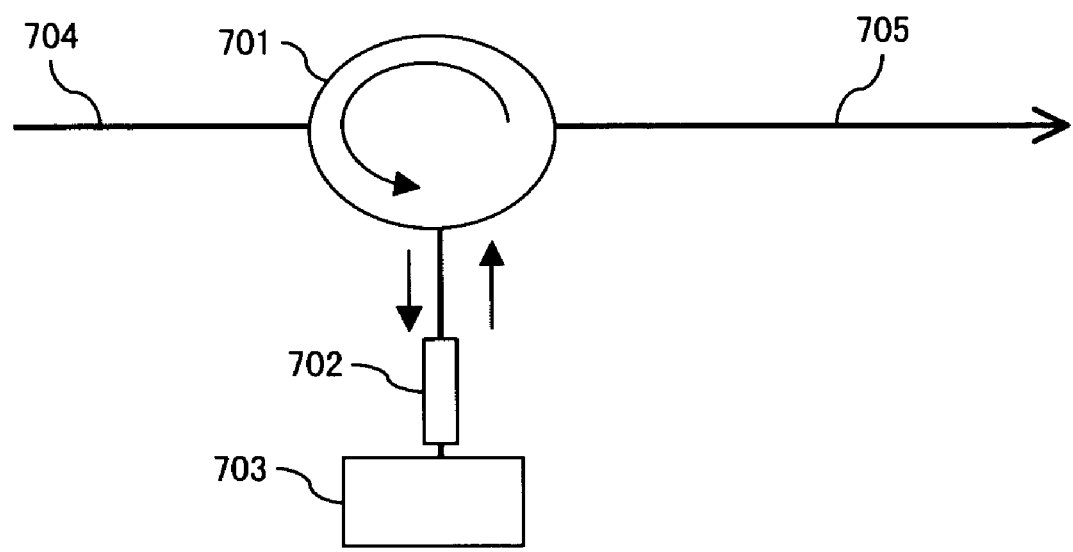
FIG. 7 shows the configuration of the first compensation filter.

The compensation filter that has such a transmission property can be materialized by a fiber grating and a light circulator as shown in FIG. 7. The compensation filter of FIG. 7 includes a light circulator 701, a fiber grating 702 and a light end 703. An input light 704 is guided to the fiber grating 702 via the light circulator 701. The reflected light from the fiber grating 702 is outputted as an output light 705 via the light circulator 701.

The fiber grating 702 generates a periodic refractive index change to the core of an optical fiber and reflects only the light that has the wavelength in the vicinity of a resonant wavelength of this grating. The refractive index change of the core is expressed with the following equation.

$$n'(z) = n_{core}(z) + \tfrac{1}{2}\Delta n(1*\sin((2\pi/\Lambda)*z))$$

Here, z is a grating length and $n_{core}$ (z) is the refractive index of the original core. n' (z) is the refractive index after a change. Δn is the maximum refractive index change. Λ is a modulation cycle. The resonant wavelength (Bragg wavelength) that is expressed using a refractive index n is 2nΛ. The full width at half maximum is approximately proportional to Δn/n.

This resonant wavelength is used as the center wavelength of a signal light. The periodic refractive index change is materialized by projecting the interference pattern that occurs, for example, when an ultraviolet laser beam is transmitted into the diffraction grating substrate of quartz. By radiating the interference pattern as a light intensity to an optical fiber, the refractive index change equivalent to this interference pattern can be generated.

In addition, the compensation filter that has the above-mentioned transmission property can be materialized also using a Fabry-Perot-type light filter of a transmission-type.

Meanwhile, in consideration of the flatness of a transmission property of the current AWG, the number of nodes which allow the light transmission without compensation is approximately ten nodes. Therefore, a preferable WDM optical communication system is materialized if compensation filters each having the same compensation amount are arranged every several nodes.

In comparison with the case of the intensive compensation, the waveform deterioration due to a nonlinear optical phenomenon can be reduced by dispersing and arranging compensation filters in this way. It is ideal to arrange a compensation filter for each AWG to reduce the waveform deterioration. However, it makes deterioration of light SN ratio larger. Therefore, when the filter is arranged every several nodes, the performance becomes better.

The accumulated transmission property of AWG becomes a problem in case of the longest path. In some longest paths, the drop/add operations are implemented in the middle of the paths. By arranging a compensation filter every several nodes, even the light signal that is dropped/added in the middle of the longest path can be compensated with a fixed ratio so that an effective compensation scheme can be offered.

FIG. 8 shows a WDM optical communication system in which a compensation filter is added every three nodes. The WDM optical communication system of FIG. 8 includes a transmission apparatus (TX) 801, light demultiplexers 802, 805, 808, 812, 815, 818, 822, 825 and 828, light multiplexers 803, 806, 809, 813, 816, 819, 823, 826 and 829, optical fibers 804, 807, 811, 814, 817, 821, 824, 827 and 830, compensation filters 810, 820 and 840, and a reception apparatus (RX) 841.

Figure 1A:
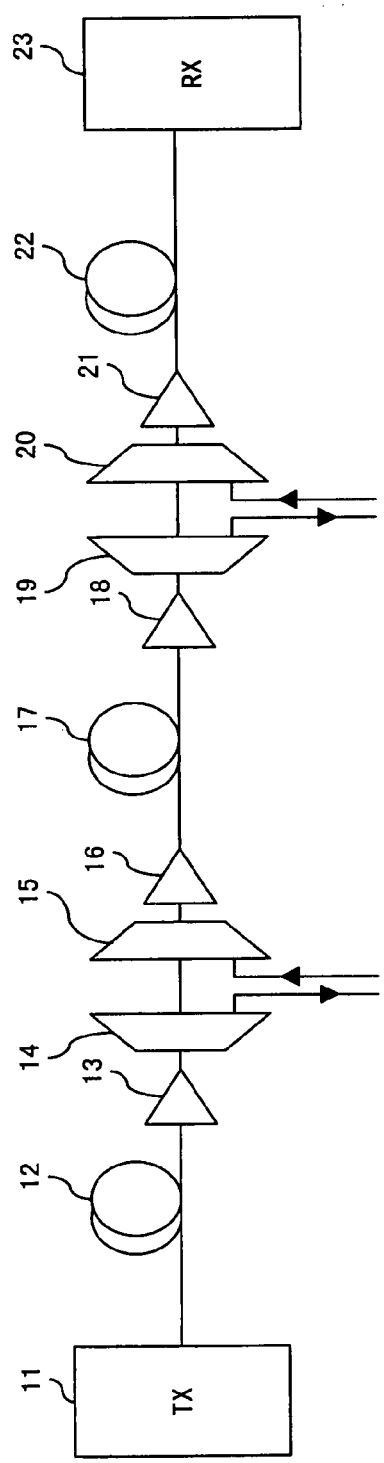
FIG. 1A shows a conventional WDM optical communication system.
Figure 1B:
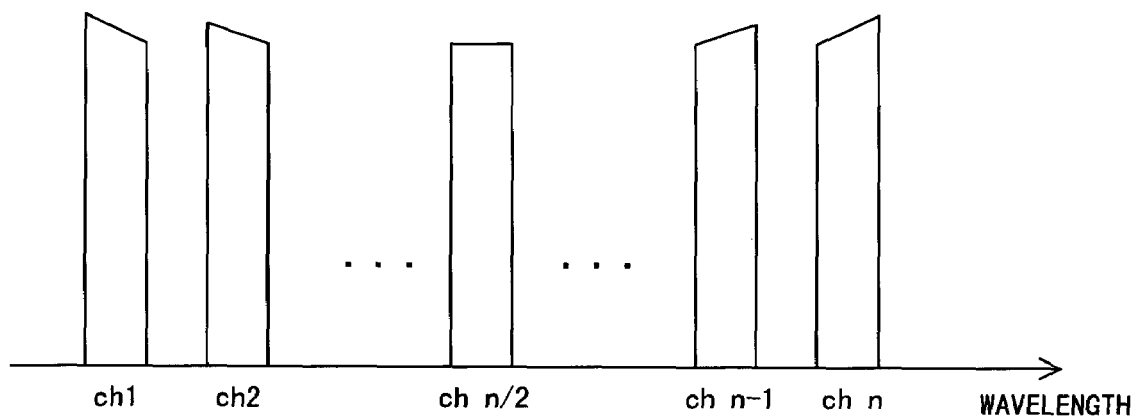
FIG. 1B shows the accumulated transmission property of AWG.

The configurations and operations of the transmission apparatus 801 and the reception apparatus 841 are similar as those of the transmission apparatus 11 and the reception apparatus 23 of FIG. 1A. According to these configurations, one compensation filter inevitably acts on a path covering three nodes that include the set of a light demultiplexer/light multiplexer each of which uses AWG. With the drop and add operations of a light signal, the number of sets of the light demultiplexer/light multiplexer on which the compensation filter acts slightly varies depending on the path but it is conceivable that this variation does not cause significant waveform deterioration.

In the configuration of FIG. 8, all the wavelength bands are compensated using one compensation filter. However, it is possible that the wavelength band is divided into three bands as a shortwave side, a center wavelength vicinity and a longwave side, and then compensation filters are respectively added to a shortwave side and a longwave side.

FIG. 9 shows such a compensation apparatus. The compensation apparatus of FIG. 9 is mounted instead of each compensation filter of FIG. 8 and includes a light amplifier 901, a band division filter 902, a shortwave side compensation filter 903, a longwave side compensation filter 904 and a band synthesis filter 905.

The band division filter 902 demultiplexes the wavelength-multiplexed light that is outputted from the light amplifier 901 into three lights such as a light on the shortwave side, a light in the vicinity of a center wavelength and a light on the longwave side. The shortwave side compensation filter 903 and the longwave side compensation filter 904 compensate a light on the shortwave side and a light on the longwave side, respectively. Then, the band synthesis filter 905 multiplexes the lights outputted from the shortwave side compensation filter 903 and the longwave side compensation filter 904, and a light in the vicinity of a center wavelength that is outputted from the band division filter 902, thereby outputting the multiplexed light.

The division filter 902 and the band synthesis filter 905 are materialized by connecting, for example, dielectric filters in series.

In the above-mentioned preferred embodiment, a compensation filter that has the transmission property determined on the basis of an envelope of the transmission property of AWG is used but instead of this filter, another compensation filter with a transmission property that periodically changes regarding the wavelength can be used. In this case, the cycle and phase of the transmission property are adjusted so as to compensate the inclination of a property in which the transmission properties in the signal wavelength band of each channel are accumulated.

FIG. 10 shows the compensation apparatus that uses such compensation filters. The compensation apparatus of FIG. 10 is mounted instead of each compensation filter of FIG. 8. This apparatus includes a light amplifier 1001, a band division filter 1002, a shortwave side compensation filter 1003, a longwave side compensation filter 1004 and a band synthesis filter 1005. The operations of the band division filter 1002 and the band synthesis filter 1005 are the same as those of the band division filter 902 and the band synthesis filter 905 of FIG. 9.

Figure 11:
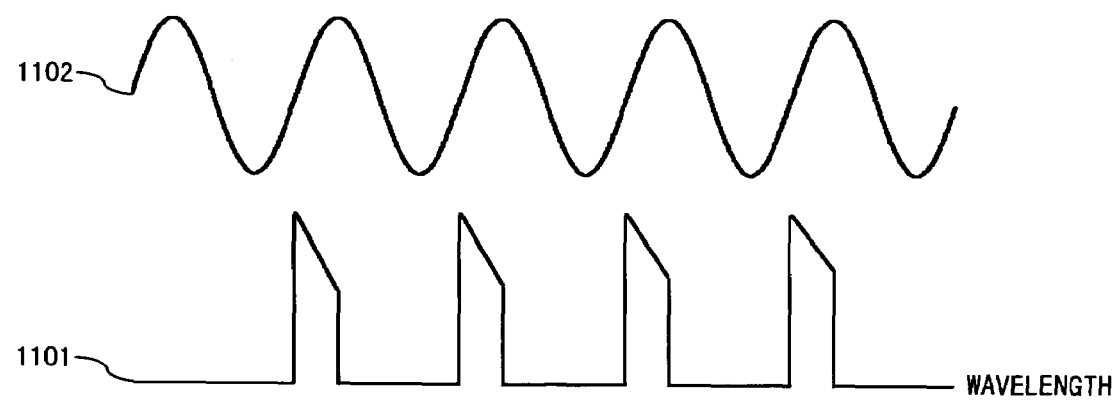
FIG. 11 shows the transmission property of a compensation filter of the third compensation apparatuses.

Each of the shortwave side compensation filter 1003 and the longwave side compensation filter 1004 includes a sine-wave-type transmission property 1102 as shown in FIG. 11. The sine wave of the transmission property 1102 has a cycle and an amplitude to delete the inclination of the accumulated transmission property 1101 of AWG. For example, when the cycle of the sine wave is the same as the channel interval of a light signal, the signal wavelength band of each channel is compensated by using the range from the maximum value to the minimum value of an inclination of the sine wave. In this case, the phase relation between the accumulated transmission property of AWG and the transmission property of the compensation filter 1003 and also the phase relation between that of AWG and the compensation filter 1004 are kept constant.

FIG. 12 shows a compensation apparatus that uses still another compensation filter. The compensation apparatus of FIG. 12 is mounted instead of the respective compensation filters of FIG. 8. This apparatus includes a light amplifier 1201, interleavers 1202 and 1211, band division filters 1203 and 1204, shortwave side compensation filters 1205 and 1207, longwave side compensation filters 1206 and 1208, and band synthesis filters 1209 and 1210.

The interleaver 1202 demultiplexes the wavelength-multiplexed light that is outputted from the light amplifier 1201 into two lights including light signals each having a double channel interval and it outputs the demultiplexed lights to the band division filters 1203 and 1204. These lights include the light signals that are taken out every other light signal from among light signals of a plurality of channels that configure the wavelength-multiplexed light.

The operations of the band division filters 1203 and 1204 are same as that of the band division filter 902 of FIG. 9. The operations of the band synthesis filters 1209 and 1210 are the same as that of the band synthesis filter 905 of FIG. 9. An interleaver 1211 multiplexes two lights that are outputted from the band synthesis filters 1209 and 1210.

Figure 13:
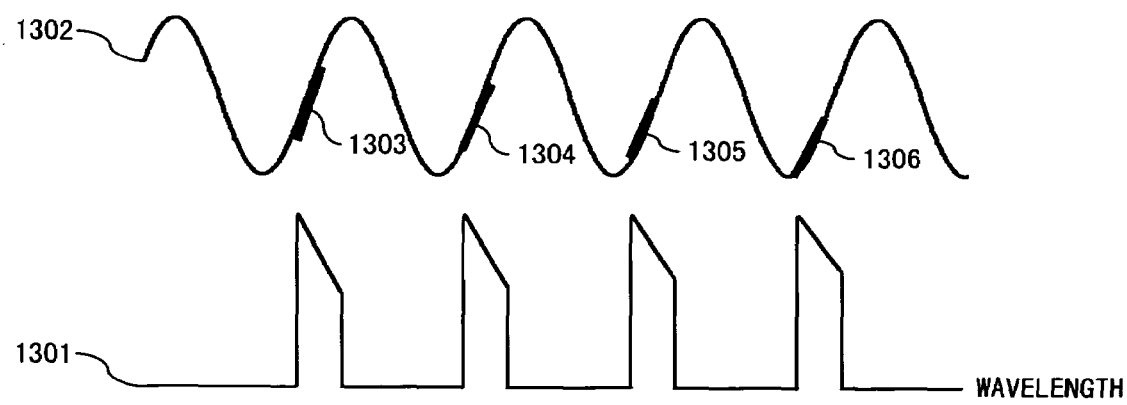
FIG. 13 shows the transmission property of a compensation filter of the fourth compensation apparatus.

Each of the shortwave side compensation filters 1205 and 1207 and the longwave side compensation filters 1206 and 1208 has a sine-wave type transmission property 1302 as shown in FIG. 13. The sine wave of a transmission property 1302 has a cycle and an amplitude to delete the inclination of an accumulated transmission property 1301 of AWG after interleaved.

The cycle of this sine wave is set, for example, almost twice the channel interval of a light signal before interleaved. By slightly deviating this cycle from the value obtained by doubling the channel interval, the inclination of the sine wave in the wavelength band matching with the signal wavelength band of each channel is gradually deviated for each channel and consequently it is set that the inclinations of the shortest wave and the longest wave become maximum.

In FIG. 13, line segments 1303 to 1306 correspond to shapes obtained by vertically flipping the upper sides of quadrangles of accumulated transmission properties of continuous four channels. The inclination of the line segment 1303 increases in accordance with the shape of the accumulated transmission property of the corresponding channel. On the other hand, the inclination of the line segment 1306 decreases in accordance with the shape of the accumulated transmission property of the corresponding channel. In this way, the inclination of the accumulated transmission property of AWG can be appropriately compensated by absorbing the inclination differences among channels.

Figure 14:
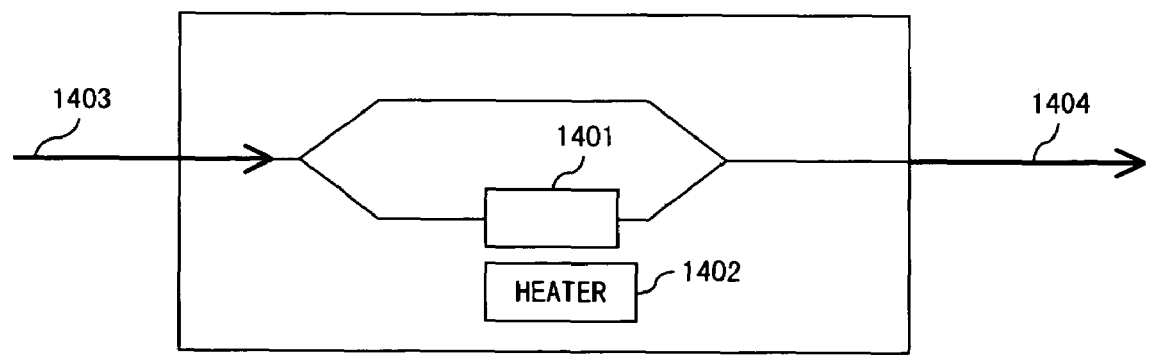
FIG. 14 shows the configuration of the second compensation filter.

The compensation filter that has such a periodic transmission property can be materialized using a Mach-Zehnder type light filter as shown in FIG. 14. The compensation filter of FIG. 14 includes an element 1401 having a light path $\Delta L$ and a heater 1402. An input light 1403 is demultiplexed into two paths and the element 1401 adds a light path difference $\Delta L$ to each of the two paths. After that, lights of the two paths are multiplexed to be outputted as an output light 1404.

The thus-multiplexed light output becomes in shape of a sine wave having a cycle $c/ng*\Delta L$. Here, c is the velocity of light and ng is a group refractive index of the element 1401. By matching the cycle of this sine wave with the intended cycle, a periodical transmission property can be materialized. Such a light filter can be produced using, for example, a quartz waveguide and the light path difference $\Delta L$ can be materialized by elongating the waveguide of either one of the two paths.

In order to materialize the inclination of the transmission property of a compensation filter with the intended frequency on a frequency axis, the fine adjustment of a light path difference is required. This fine adjustment can be materialized by heating either one of the two paths using the heater 1402 and changing the refractive index.

According to the configurations in FIGS. 9, 10 and 12, a wavelength-multiplexed light is demultiplexed into lights of three bands by a band division filter but generally the number of divisions is optional so that the light can be demultiplexed into lights of five or seven bands.

What is claimed is:

1. A compensation apparatus used in a wavelength-multiplexed optical communication system that has a plurality of sets of light demultiplexers and light multiplexers, comprising a compensation device having a transmission property which indicates a dependence of a transmission rate on wavelengths, the transmission rate being a rate of light passing through the compensation device in light input to the compensation device, for collectively compensating inclinations of accumulated transmission properties in a signal wavelength band of light signals of a plurality of channels configuring a wavelength-multiplexed light, among wavelength dependencies of transmission properties of the plurality of sets of light demultiplexers and light multiplexers.

2. The compensation apparatus according to claim 1, wherein the compensation device has a transmission property in shape of a curve obtained by vertically flipping an envelope of a shape in each signal wavelength band in a drawing showing wavelength dependencies of the accumulated transmission properties.

3. The compensation apparatus according to claim 1, wherein the compensation device has a transmission property having a shape that periodically changes for a wavelength and the transmission property has an inclination opposite to an inclination of the accumulated transmission property in a signal wavelength band of a light signal of each channel.

4. A compensation apparatus used in a wavelength-multiplexed optical communication system that has a plurality of sets of light demultiplexers and light multiplexers, comprising:

a demultiplexing device demultiplexing a wavelength-multiplexed light into light signals of respective channels;

a compensation device having a transmission property which indicates a dependence of a transmission rate on wavelengths, the transmission rate being a rate of light passing through the compensation device in light input to the compensation device, for compensating inclinations of accumulated transmission properties in a signal wavelength band of light signals of respective channels demultiplexed by the demultiplexing device, among wavelength dependencies of transmission properties of the plurality of sets of light demultiplexers and light multiplexes; and a multiplexing device multiplexing light signals of respective channels outputted from the compensation device, and outputting the multiplexed signal.

5. The compensation apparatus according to claim 4, wherein the compensation device has a transmission property with an inclination opposite to an inclination of the accumulated transmission property.

6. A compensation apparatus used in a wavelength-multiplexed optical communication system that has a plurality of sets of light demultiplexers and light multiplexers, comprising:

a band demultiplexing device demultiplexing a wavelength-multiplexed light into three lights of a shortwave side band, a center wavelength band and a longwave side band;

a shortwave side compensation device having a transmission property which indicates a dependence of a transmission rate on wavelengths, the transmission rate being a rate of light passing through the shortwave side compensation device in light input to the shortwave side compensation device, for collectively compensating inclinations of accumulated transmission properties in a signal wavelength band of light signals of a plurality of channels configuring the light of the shortwave side band, among wavelength dependencies of transmission properties of the plurality of sets of light demultiplexers and light multiplexers;

a longwave side compensation device having a transmission property which indicates a dependence of a transmission rate on wavelengths, the transmission rate being a rate of light passing through the longwave side compensation device in light input to the longwave side compensation device, for collectively compensating inclinations of accumulated transmission properties in a signal wavelength band of light signals of a plurality of channels configuring the light of the longwave side band, among wavelength dependencies of transmission properties of the plurality of sets of light demultiplexers and light multiplexers; and a band multiplexing device multiplexing a light of the center wavelength band outputted from the band demultiplexing device and lights outputted from the shortwave side compensation device and the longwave side compensation device, and outputting the multiplexed light.

7. The compensation apparatus according to claim 6, wherein each of the shortwave side compensation device and the longwave side compensation device has a sine-wave-type transmission property of a cycle same as a channel interval of each of the plurality of channels and the transmission property has an inclination opposite to a property of the accumulated transmission property in a signal wavelength band of a light signal of each channel.

8. A compensation apparatus used in a wavelength-multiplexed optical communication system that has a plurality of sets of light demultiplexers and light multiplexers, comprising:

a demultiplexing device demultiplexing a wavelength-multiplexed light into two lights including light signals each having a channel interval which is twice a channel interval of each of light signals of a plurality of channels configuring the wavelength-multiplexed light, and outputting the two lights;

a first band demultiplexing device demultiplexing one of the two lights outputted from the demultiplexing device into three lights of a first shortwave side band, a first center wavelength band and a first longwave side band;

a first shortwave side compensation device having a transmission property which indicates a dependence of a transmission rate on wavelengths, the transmission rate being a rate of light passing through the first shortwave side compensation device in light input to the first shortwave side compensation device, for collectively compensating inclinations of accumulated transmission properties in a signal wavelength band of light signals of a plurality of channels configuring the light of the first shortwave side band, among wavelength dependencies of transmission properties of the plurality of sets of light demultiplexers and light multiplexers;

a first longwave side compensation device having a transmission property which indicates a dependence of a transmission rate on wavelengths, the transmission rate being a rate of light passing through the first longwave side compensation device in light input to the first longwave side compensation device, for collectively compensating inclinations of accumulated transmission properties in a signal wavelength band of light signals of a plurality of channels configuring the light of the first longwave side band, among wavelength dependencies of transmission properties of the plurality of sets of light demultiplexers and light multiplexers;

a first band multiplexing device multiplexing the light of the first center wavelength band outputted from the first band demultiplexing device and lights outputted from the first shortwave side compensation device and the first longwave side compensation device, and outputting the multiplexed light;

a second band demultiplexing device demultiplexing the other of the two lights outputted from the demultiplexing device into three lights of a second shortwave side band, a second center wavelength band and a second longwave side band;

a second shortwave side compensation device having a transmission property which indicates a dependence of a transmission rate on wavelengths, the transmission rate being a rate of light passing through the second shortwave side compensation device in light input to the second shortwave side compensation device, for collectively compensating inclinations of accumulated transmission properties in a signal wavelength band of light signals of a plurality of channels configuring the light of the second shortwave side band, among wavelength dependencies of transmission properties of the plurality of sets of light demultiplexers and light multiplexers;

a second longwave side compensation device having a transmission property which indicates a dependence of a transmission rate on wavelengths, the transmission rate being a rate of light passing through the second longwave side compensation device in light input to the second longwave side compensation device, for collectively compensating inclinations of accumulated transmission properties in a signal wavelength band of light signals of a plurality of channels configuring the light of the second longwave side band, among wavelength dependencies of transmission properties of the plurality of sets of light demultiplexers and light multiplexers;

a second band multiplexing device multiplexing the light of the second center wavelength band outputted from the second band demultiplexing device and lights outputted from the second shortwave side compensation device and the second longwave side compensation device, and outputting the multiplexed light; and a multiplexing device multiplexing lights outputted from the first and second band multiplexing devices and outputting the multiplexed light.

9. The compensation apparatus according to claim 8, wherein the first and the second shortwave side compensation devices and the first and second longwave side compensation devices have sine-wave-type transmission properties each having a cycle which is approximately twice a channel interval of each of the plurality of channels and the transmission properties have inclination opposite to inclination of the accumulated transmission property.

10. A compensation method used in a wavelength-multiplexed optical communication system that has a plurality of sets of light demultiplexers and light multiplexers, comprising arranging in the wavelength-multiplexed light transmission system a compensation device having a transmission property which indicates a dependence of a transmission rate on wavelengths, the transmission rate being a rate of light passing through the compensation device in light input to the compensation device, for collectively compensating inclinations of accumulated transmission properties in a signal wavelength band of light signals of a plurality of channels configuring a wavelength-multiplexed light, among wavelength dependencies of transmission properties of the plurality of sets of light demultiplexers and light multiplexers.

11. A compensation method used in a wavelength-multiplexed optical communication system that has a plurality of sets of light demultiplexers and light multiplexers, comprising:

demultiplexing a wavelength-multiplexed light into light signals of respective channels;

inputting light signals of respective channels into a compensation device having a transmission property which indicates a dependence of a transmission rate on wavelengths, the transmission rate being a rate of light passing through the compensation device in light input to the compensation device, for compensating inclinations of accumulated transmission properties in a signal wavelength band of light signals of respective demultiplexed channels, among wavelength dependencies of transmission properties of the plurality of sets of light demultiplexers and light multiplexes; and multiplexing light signals of respective channels outputted from the compensation device.

12. A compensation method used in a wavelength-multiplexed optical communication system that has a plurality of sets of light demultiplexers and light multiplexers, comprising:

demultiplexing a wavelength-multiplexed light into three lights of a shortwave side band, a center wavelength band and a longwave side band;

inputting the light of the shortwave side into a shortwave side compensation device having a transmission property which indicates a dependence of a transmission rate on wavelengths, the transmission rate being a rate of light passing through the shortwave side compensation device in light input to the shortwave side compensation device, for collectively compensating inclinations of accumulated transmission properties in a signal wavelength band of light signals of a plurality of channels configuring the light of the shortwave side band, among wavelength dependencies of transmission properties of the plurality of sets of light demultiplexers and light multiplexers;

inputting the light of the longwave side band into a longwave side compensation device having a transmission property which indicates a dependence of a transmission rate on wavelengths, the transmission rate being a rate of light passing through the longwave side compensation device in light input to the longwave side compensation device, for collectively compensating inclinations of accumulated transmission properties in a signal wavelength band of light signals of a plurality of channels configuring the light of the longwave side band, among wavelength dependencies of transmission properties of the plurality of sets of light demultiplexers and light multiplexers; and multiplexing a light of the center wavelength band and lights outputted from the shortwave side compensation device and the longwave side compensation device.

13. A compensation method used in a wavelength-multiplexed optical communication system that has a plurality of sets of light demultiplexers and light multiplexers, comprising:

demultiplexing a wavelength-multiplexed light into two lights including light signals each having a channel interval which is twice a channel interval of each of light signals of a plurality of channels configuring the wavelength-multiplexed light;

demultiplexing one of the two lights into three lights of a first shortwave side band, a first center wavelength band and a first longwave side band;

inputting the light of the first shortwave side into a first shortwave side compensation device having a transmission property which indicates a dependence of a transmission rate on wavelengths, the transmission rate being a rate of light passing through the first shortwave side compensation device in light input to the shortwave side compensation device, for collectively compensating inclinations of accumulated transmission properties in a signal wavelength band of light signals of a plurality of channels configuring the light of the first shortwave side band, among wavelength dependencies of transmission properties of the plurality of sets of light demultiplexers and light multiplexers;

inputting the light of the first longwave side band into a first longwave side compensation device having a transmission property which indicates a dependence of a transmission rate on wavelengths, the transmission rate being a rate of light passing through the first longwave side compensation device in light input to the first longwave side compensation device, for collectively compensating inclinations of accumulated transmission properties in a signal wavelength band of light signals of a plurality of channels configuring the light of the first longwave side band, among wavelength dependencies of transmission properties of the plurality of sets of light demultiplexers and light multiplexers;

demultiplexing the other of the two lights into three lights of a second shortwave side band, a second center wavelength band and a second longwave side band;

inputting the light of the second shortwave side into a second shortwave side compensation device having a transmission property which indicates a dependence of a transmission rate on wavelengths, the transmission rate being a rate of light passing through the second shortwave side compensation device in light input to the second shortwave side compensation device, for collectively compensating inclinations of accumulated transmission properties in a signal wavelength band of light signals of a plurality of channels configuring the light of the second shortwave side band, among wavelength dependencies of transmission properties of the plurality of sets of light demultiplexers and light multiplexers;

inputting the light of the second longwave side into a second longwave side compensation device having a transmission property which indicates a dependence of a transmission rate on wavelengths, the transmission rate being a rate of light passing through the second longwave side compensation device in light input to the second longwave side compensation device, for collectively compensating inclinations of accumulated transmission properties in a signal wavelength band of light signals of a plurality of channels configuring the light of the second longwave side band, among wavelength dependencies of transmission properties of the plurality of sets of light demultiplexers and light multiplexers; and multiplexing lights of the first and second center wavelength bands, lights outputted from the first and second shortwave side compensation devices, and lights outputted from the first and second longwave side compensation devices.

14. A compensation apparatus used in a wavelength-multiplexed optical communication system that has a plurality of sets of light demultiplexers and light multiplexers, comprising:

compensation means having a transmission property which indicates a dependence of a transmission rate on wavelengths, the transmission rate being a rate of light passing through the compensation means in light input to the compensation means, for collectively compensating the inclinations of accumulated transmission properties in a signal wavelength band of light signals of a plurality of channels configuring a wavelength-multiplexed light, among wavelength dependencies of transmission properties of the plurality of sets of light demultiplexers and light multiplexers; and outputting means for outputting a wavelength-multiplexed light in which an inclination of the accumulated transmission property is compensated by the compensation means.

15. A compensation apparatus used in a wavelength-multiplexed optical communication system that has a plurality of sets of light demultiplexers and light multiplexers, comprising:

demultiplexing means for demultiplexing a wavelength-multiplexed light into light signals of respective channels;

compensation means having a transmission property which indicates a dependence of a transmission rate on wavelengths, the transmission rate being a rate of light passing through the compensation means in light input to the compensation mean, for compensating inclinations of accumulated transmission properties in a signal wavelength band of light signals of respective channels demultiplexed by the demultiplexing means, among wavelength dependencies of transmission properties of the plurality of sets of light demultiplexers and light multiplexes; and multiplexing means for multiplexing light signals of respective channels outputted from the compensation means, and outputting the multiplexed signal.

16. A compensation apparatus used in a wavelength-multiplexed optical communication system that has a plurality of sets of light demultiplexers and light multiplexers, comprising:

band demultiplexing means for demultiplexing a wavelength-multiplexed light into three lights of a shortwave side band, a center wavelength band and a longwave side band;

shortwave side compensation means having a transmission property which indicates a dependence of a transmission rate on wavelengths, the transmission rate being a rate of light passing through the shortwave side compensation means in light input to the shortwave side compensation means, for collectively compensating inclinations of accumulated transmission properties in a signal wavelength band of light signals of a plurality of channels configuring the light of the shortwave side band, among wavelength dependencies of transmission properties of the plurality of sets of light demultiplexers and light multiplexers;

longwave side compensation means having a transmission property which indicates a dependence of a transmission rate on wavelengths, the transmission rate being a rate of light passing through the longwave side compensation means in light input to the longwave side compensation means, for collectively compensating inclinations of accumulated transmission properties in a signal wavelength band of light signals of a plurality of channels configuring the light of the longwave side band, among wavelength dependencies of transmission properties of the plurality of sets of light demultiplexers and light multiplexers; and band multiplexing means for multiplexing a light of the center wavelength band outputted from the band demultiplexing means and lights outputted from the shortwave side compensation means and the longwave side compensation means, and outputting the multiplexed light.

17. A compensation apparatus used in a wavelength-multiplexed optical communication system that has a plurality of sets of light demultiplexers and light multiplexers, comprising:

demultiplexing means for demultiplexing a wavelength-multiplexed light into two lights including light signals each having a channel interval twice a channel interval of each of light signals of a plurality of channels configuring the wavelength-multiplexed light;

first band demultiplexing means for demultiplexing one of the two lights outputted from the demultiplexing means into three lights of a first shortwave side band, a first center wavelength band and a first longwave side band;

first shortwave side compensation means having a transmission property which indicates a dependence of a transmission rate on wavelengths, the transmission rate being a rate of light passing through the first shortwave compensation means in light input to the first shortwave compensation means, for collectively compensating inclinations of accumulated transmission properties in a signal wavelength band of light signals of a plurality of channels configuring the light of the first shortwave side band, among wavelength dependencies of transmission properties of the plurality of sets of light demultiplexers and light multiplexers;

first longwave side compensation means having a transmission property which indicates a dependence of a transmission rate on wavelengths, the transmission rate being a rate of light passing through the first longwave side compensation means in light input to the first longwave side compensation means, for collectively compensating inclinations of accumulated transmission properties in a signal wavelength band of light signals of a plurality of channels configuring the light of the first longwave side band, among wavelength dependencies of transmission properties of the plurality of sets of light demultiplexers and light multiplexers;

first band multiplexing means for multiplexing a tight of the first center wavelength band outputted from the first band demultiplexing means and lights outputted from the first shortwave side compensation means and the first longwave side compensation means, and outputting the multiplexed light;

second band demultiplexing means for demultiplexing the other of the two lights outputted from the demultiplexing means into three lights of a second shortwave side band, a second center wavelength band and a second longwave side band;

second shortwave side compensation means having a transmission property which indicates a dependence of a transmission rate on wavelengths, the transmission rate being a rate of light passing through the second shortwave side compensation means in light input to the second shortwave side compensation means, for collectively compensating inclinations of accumulated transmission properties in a signal wavelength band of light signals of a plurality of channels configuring the light of the second shortwave side band, among wavelength dependencies of transmission properties of the plurality of sets of light demultiplexers and light multiplexers;

second longwave side compensation means having a transmission property which indicates a dependence of a transmission rate on wavelengths, the transmission rate being a rate of light passing through the second longwave side compensation means in light input to the second longwave side compensation means, for collectively compensating inclinations of accumulated transmission properties in a signal wavelength band of light signals of a plurality of channels configuring the light of the second longwave side band, among wavelength dependencies of transmission properties of the plurality of sets of light demultiplexers and light multiplexers;

second band multiplexing means for multiplexing a light of the second center wavelength band outputted from the second band demultiplexing means and lights outputted from the second shortwave side compensation means and the second longwave side compensation means, and outputting the multiplexed light; and multiplexing means for multiplexing lights outputted from the first and second band multiplexing means, thereby outputting the multiplexed light.

18. An apparatus comprising:

a compensation device through which a wavelength multiplexed light including a plurality of channels at different wavelengths multiplexed together passes, wherein the compensation device has a transmission property which indicates a dependence of a transmission rate on wavelengths, the transmission rate being a rate of light passing through the compensation device in light input to the compensation device, and the transmission property of the compensation device is inverse to an accumulated transmission property corresponding to a plurality of sets of light demultiplexers and light multiplexers through which the wavelength multiplexed light passes, so that the compensation device thereby compensates for the accumulated transmission property for the wavelengths of the channels.

* * * * *

UNITED STATES PATENT AND TRADEMARK OFFICE
CERTIFICATE OF CORRECTION

PATENT NO. : 7,266,264 B2
APPLICATION NO. : 11/019205
DATED : September 4, 2007
INVENTOR(S) : Hiroshi Nakamoto et al.

It is certified that error appears in the above-identified patent and that said Letters Patent is hereby corrected as shown below:

Col. 8, line 54, delete "multiplexes;" and insert --multiplexers;--

Col. 11, line 38, delete "multiplexes;" and insert --multiplexers;--

Col. 13, line 47, delete "mean," and insert --means,--

Col. 13, line 53, delete "multiplexes;" and insert --multiplexers;--

Col. 14, line 66, delete "tight" and insert --light--, therefor.

Signed and Sealed this

Twenty-second Day of January, 2008

JON W. DUDAS
*Director of the United States Patent and Trademark Office*